US008749534B2

(12) United States Patent
Man et al.

(10) Patent No.: US 8,749,534 B2
(45) Date of Patent: Jun. 10, 2014

(54) LOW-COST AND PIXEL-ACCURATE TEST METHOD AND APPARATUS FOR TESTING PIXEL GENERATION CIRCUITS

(75) Inventors: Albert Tung-chu Man, Richmond Hill (CA); William Anthony Jonas, Mt. Albert (CA); Stephen (Yun-Yee) Leung, Markham (CA); Nancy Chan Ngar Sze, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 1405 days.

(21) Appl. No.: 12/369,696

(22) Filed: Feb. 11, 2009

(65) Prior Publication Data

US 2009/0213226 A1 Aug. 27, 2009

Related U.S. Application Data

(60) Provisional application No. 61/027,696, filed on Feb. 11, 2008.

(51) Int. Cl.
*G09G 5/00* (2006.01)
*H04N 17/00* (2006.01)

(52) U.S. Cl.
USPC ............................ 345/204; 345/207; 348/189

(58) Field of Classification Search
CPC .............. G09G 3/006; G09G 2330/10; G09G 2360/10; G09G 2370/12; G09G 2370/047
USPC ............. 345/97, 92, 108, 111, 204, 207, 441, 345/613, 694–698; 348/46, 51, 189, 373, 348/375; 358/10
See application file for complete search history.

(56) References Cited

U.S. PATENT DOCUMENTS

| | | | | |
|---|---|---|---|---|
| 4,772,948 A | | 9/1988 | Irvin | |
| 4,775,857 A | * | 10/1988 | Staggs | 345/548 |
| 4,780,755 A | | 10/1988 | Knierim | |
| 4,894,718 A | | 1/1990 | Hung | |
| 4,908,871 A | * | 3/1990 | Hara et al. | 382/147 |
| 5,051,816 A | * | 9/1991 | Harrison et al. | 714/736 |
| 5,081,523 A | * | 1/1992 | Frazier | 348/178 |
| 5,325,108 A | * | 6/1994 | Salam | 345/108 |
| 5,345,263 A | | 9/1994 | Miller | |

(Continued)

FOREIGN PATENT DOCUMENTS

DE 29721762 U1 12/1997

OTHER PUBLICATIONS

Digital Display Working Group (DDWG); Digital Visual Interface (DVI); Apr. 2, 1999.

(Continued)

*Primary Examiner* — Prabodh M Dharia
(74) *Attorney, Agent, or Firm* — Faegre Baker Daniels LLP

(57) ABSTRACT

A method and system of testing pixels output from a pixel generation unit under test includes generating pixels from the pixel generation unit under test using a first test data pattern to generate pixel information. The method and system also generate a per pixel error value for a pixel from the unit under test that contains an error based on the pixel by pixel comparison with pixel information generated substantially concurrently with pixels by a different unit using the first test data pattern. If desired, corresponding pixel screen location information (e.g., x-y location) can also be determined for the pixel that has the error. The per pixel error and x-y location information can be displayed.

16 Claims, 7 Drawing Sheets

(56) References Cited

U.S. PATENT DOCUMENTS

| | | | | |
|---|---|---|---|---|
| 5,414,713 | A | 5/1995 | Waschura et al. | |
| 5,434,595 | A * | 7/1995 | Macaulay | 345/207 |
| 5,537,145 | A | 7/1996 | Miseli | |
| 5,740,352 | A * | 4/1998 | Philipp et al. | 714/40 |
| 5,835,134 | A | 11/1998 | Thacker | |
| 5,861,882 | A | 1/1999 | Sprenger et al. | |
| 5,884,044 | A | 3/1999 | Marsanne et al. | |
| 5,920,340 | A | 7/1999 | Man et al. | |
| 5,943,092 | A | 8/1999 | Chuang et al. | |
| 6,084,627 | A * | 7/2000 | Cook et al. | 347/248 |
| 6,101,620 | A * | 8/2000 | Ranganathan | 714/718 |
| 6,219,039 | B1 | 4/2001 | Chang et al. | |
| 6,323,828 | B1 | 11/2001 | Perez | |
| 6,373,476 | B1 | 4/2002 | Dalgleish et al. | |
| 6,505,266 | B1 | 1/2003 | Gu | |
| 6,674,531 | B2 * | 1/2004 | Mahner | 356/457 |
| 6,919,892 | B1 * | 7/2005 | Cheiky et al. | 345/473 |
| 7,006,117 | B1 * | 2/2006 | Man et al. | 345/501 |
| 7,009,625 | B2 * | 3/2006 | Dickinson | 345/629 |
| 7,184,066 | B2 * | 2/2007 | Elliot et al. | 345/694 |
| 7,386,161 | B2 * | 6/2008 | Weiss et al. | 382/141 |
| 7,872,645 | B2 * | 1/2011 | Myers | 345/207 |
| 8,212,826 | B1 * | 7/2012 | Williams et al. | 345/520 |
| 8,344,977 | B2 * | 1/2013 | Park et al. | 345/89 |
| 2003/0085906 | A1 * | 5/2003 | Elliott et al. | 345/613 |
| 2004/0012580 | A1 * | 1/2004 | Yamagishi et al. | 345/204 |
| 2006/0215899 | A1 * | 9/2006 | Oaki | 382/145 |
| 2008/0158363 | A1 * | 7/2008 | Myers | 348/187 |
| 2008/0309884 | A1 * | 12/2008 | O'Dor et al. | 353/7 |
| 2008/0316157 | A1 * | 12/2008 | Park et al. | 345/89 |

OTHER PUBLICATIONS

IBM Technical Disclosure Bulletin; Automated Video Test Card with Self-Test Mechanisms; Oct. 1989.

Negley, Bruce; Using the 24LC21 Dual Mode Serial EEPROM; Microchip Technology Inc.; 1995.

Video Digital Flat Panel Standard; pp. 1-16; Feb. 14, 1999.

Li, Mike et al.; Requirements, Challenges, and Solutions for Testing Multiple GB/s ICs in Production; International Test Conference; 2003.

HFTA-05.0: Statistical Confidence Levels for Estimating Error Probability; Maxim Application Notes; Nov. 2007.

* cited by examiner

LOW-COST AND PIXEL-ACCURATE TEST METHOD AND APPARATUS FOR TESTING PIXEL GENERATION CIRCUITS

CROSS-REFERENCE TO RELATED APPLICATION

This application claims priority to the provisional patent application having Application No. 61/027,696, filed Feb. 11, 2008, having inventors Albert Tung-chu Man et al. and owned by instant assignee, for LOW-COST AND PIXEL-ACCURATE TEST METHOD AND APPARATUS FOR TESTING PIXEL GENERATION CIRCUITS.

BACKGROUND OF THE DISCLOSURE

The present disclosure relates generally to methods and apparatus for testing pixel information.

DisplayPort is the latest digital display interface defined by VESA. See, for example, articles such as A self-test BOST for High-frequency PLLs, DLLs, and SerDes, Stephen Sunter & Aubin Royansuz, ITC' 2006; VESA DisplayPort Link Layer Compliance Test Standard Version 1.0, Sep. 14, 2007, VESA; and VESA DisplayPort Standard, Version 1, Revision la, Jan. 11, 2008, VESA. One of the challenges in the implementation of DisplayPort, DVI or other suitable display link, is testing of, for example, 1.62 Gbps and 2.7 Gbps operation at a reasonable cost. This high speed pixel information is typically generated by a pixel generation circuit such as one or more graphics (and/or video) cores for output to a digital display such as an LCD (or other type of display) of a computer, digital television, handheld device or other device. One method would be to use the ATE (Automated Test Equipment) high-speed channel to measure the eye pattern and capture thousands of cycles of data patterns; however, it is expensive and impractical (due to long test time). In addition, it is difficult to distinguish a failure at ATE compared with a possible failure at the LCD panel.

BRIEF DESCRIPTION OF THE DRAWINGS

The invention will be more readily understood in view of the following description when accompanied by the below figures and wherein like reference numerals represent like elements, wherein.

DETAILED DESCRIPTION OF A PREFERRED EMBODIMENT SET FORTH IN THE DISCLOSURE

Briefly, a method and system of testing pixels output from a pixel generation unit under test includes generating pixels from the pixel generation unit under test using a first test data pattern to generate pixel information. The method and system also generate a per pixel error value for a pixel from the unit under test that contains an error based on the pixel by pixel comparison with pixel information generated substantially concurrently with pixels by a different unit using the first test data pattern. If desired, corresponding pixel screen location information (e.g., x-y location) can also be determined for the pixel that has the error. The per pixel error and x-y location information can be displayed.

As also set forth below, the method and system send the generated pixel information via a plurality of lanes to the different unit; and send control information via a different channel than the plurality of lanes to the different unit to control selection of which of a plurality of selectable test data patterns to generate. If desired, a user interface is provided that is operative to allow a setting of a per pixel error injection and a number of frames over which to apply the injected error. The user interface may also provide per pixel error values as generated by the different unit.

The test system works with a pixel generation circuit such as a graphic controller (e.g., a graphics/video processor core or any other suitable pixel generation circuit) that incorporates one or multiple DisplayPort connectors or any other suitable digital display link.

The system provides a low-cost, versatile and at-speed test method and apparatus to test high-speed serial transmitters such as DisplayPort transmitters or any other suitable pixel communication link. The solution can support serial transfer rate of 10.7 Gpbs and capture failing data streaming in real-time. This diagnostic capability can generally not be found in commercial test instrumentation. It is capable of reporting the value of failing pixels and their respective locations in single or multiple frames.

The solution meets the following requirements: it can perform device characterization and endurance tests; it can perform a board level test in high volume production; it is adaptable to an ATE environment; it can perform compatibility test with LCD panels; and it can debug high speed DisplayPort transmitters/receivers.

Application to board level testing and ATE level testing are set forth below. This low-cost card replaces a DisplayPort Panel (which is new and expensive) that is required to test GPU (graphics processing unit) board or full system in production line. As set forth below, test algorithms are used and an FPGA (field programmable gate array) may be used. Commonly used Bit Error Rate (BER) criteria for high speed SERDES testing are also employed.

Figure 1:
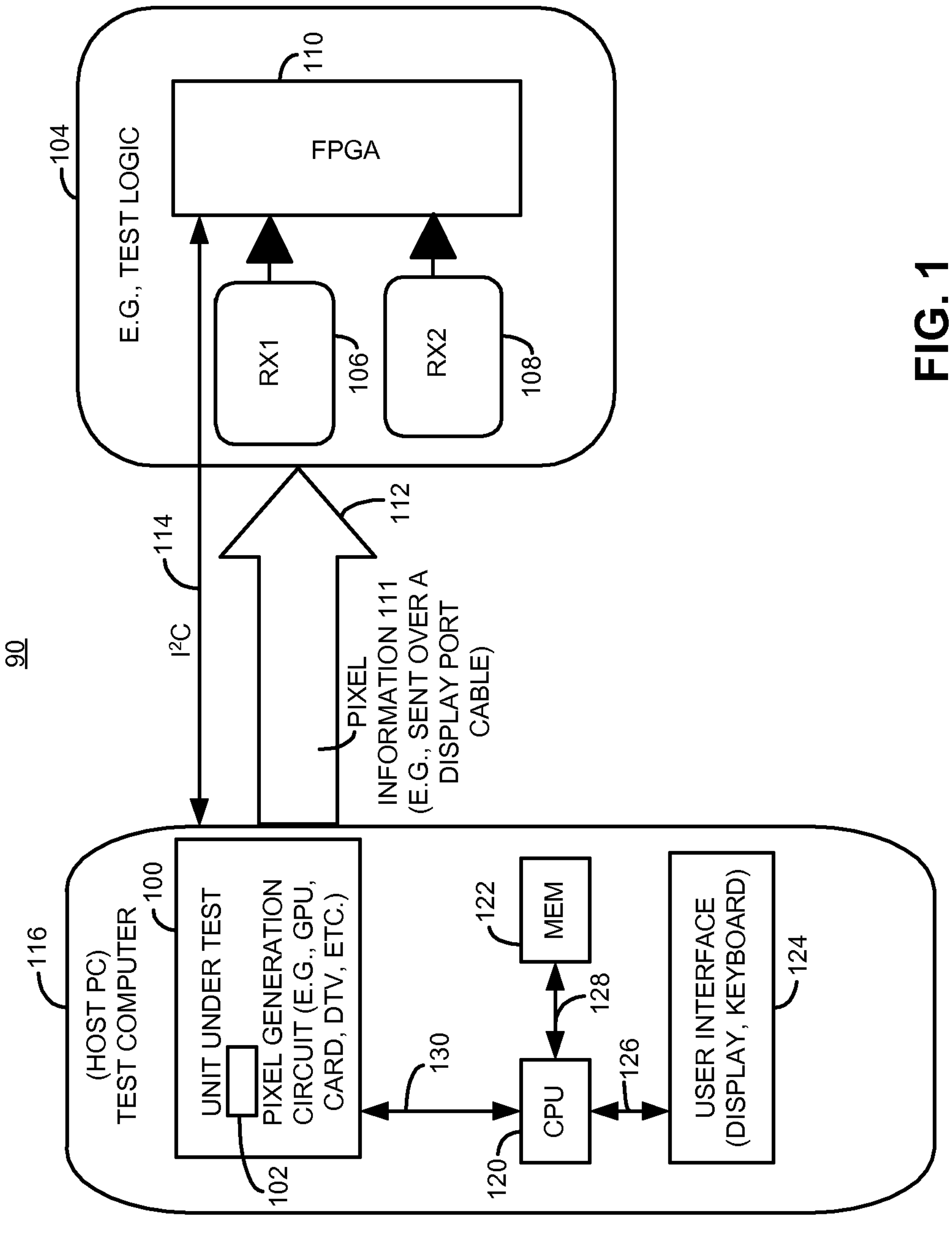
FIG. 1 is a block diagram illustrating one example of a device under test (e.g., a graphics/video processing card) and a test apparatus according to one example of the disclosure.

FIG. 1 illustrates an example of a hardware setup for testing a board. The test card works with pixel generation circuits, including but not limited to circuits that employ graphics processors (e.g., graphics/video processing cores) such those sold by AMD Inc., Sunnyvale, Calif., including graphic cards that have a DisplayPort type connector.

FIG. 1 shows a unit under test 100, in this example a card that contains a graphics processor 102, such as the type that may interface with a motherboard in a laptop computer or any other pixel generation circuit. The card may be coupled to other logic such as a mother board under test.

The main components of one of the test controllers, test logic 104, shown as a test card, are two DisplayPort receivers 106 and 108 from different vendors and a field programmable gat array (FPGA) 110. Hardware may be populated with one receiver only or any suitable number of receivers. A second receiver can be used to recreate the same failing symptom. This can help in diagnosing compatibility issues. The test card 104 is pixel-accurate, i.e., it can report the x-y coordinates of the failing pixels and their corresponding values. For example, the error correction block may track the x-y location of each pixel in the frame of the test data pattern from the pattern generator along with the error and report both pieces of information.

A system 90 may include a standard DisplayPort cable 112, a 5V power plug (not shown) and external 12C hardware 114 to allow communication with the test logic 104. The test card 104 can optionally plug in the PCI slot of a host computer to get its power supply.

There are two ways to send the results from the test card 104: one is to use stand-alone 12C hardware to send and display the results in a separate system; the other is to send the results back to the test computer 116 via the auxiliary port of DisplayPort. The latter will simplify the setup in a high volume manufacturing line.

As shown above, the system 90 may include the test computer 116 that is operatively coupled to a unit under test 100 whether it is an integrated circuit chip, plug-in card, digital television, or any other suitable unit. The test logic 104 which may include the FPGA 110 or any other suitable structure may receive commands from the test computer 116 via any suitable link. The test logic 104 independently generates its own test pattern after being informed as to when and which test pattern to generate by, for example, the test computer 116. The test computer 116 also generates its own test pattern and applies it to the unit under test 100. The unit under test 100 then sends the resulting pixel information 111 over, for example, the DisplayPort cable 112 or any other suitable link and is received by one of the receivers 106, 108, and the error detector of the test logic 104 detects difference between the test pattern that was generated independently by the test logic 104 with the pixel information from the unit under test to determine if there was an error, on a pixel-by-pixel basis. The comparison on a pixel-by-pixel basis may be done in real time. The error results may then be stored in control registers of the test logic 104 or other memory element and provided via a user interface 124 to a user. The test computer 116 reads the error information periodically if desired through the $I^2C$ link. The test computer 116 and the test logic 104, each generate the same test pattern but generate them on their own.

It will also be recognized that the FPGA 110 and test logic 104 may be implemented in any suitable form including, but not limited to, programmable instructions executable by a digital processing unit such as one or more CPUs or any other suitable digital processing units and that the executable instructions may be stored in memory such as ROM, RAM or any other suitable memory whether local or distributed. In addition, it will be recognized that the FPGA includes ROM (or RAM) thereon that includes the code to carry out the algorithms described above. The test computer as shown also includes one or more CPUs, memory that stores executable instructions that when executed cause the CPU to provide the necessary operations as described herein to provide the user interface and to receive information entered by a user via the interface and to send the requisite commands and query the test logic as described herein. It will be recognized that any suitable structure may be employed.

The test computer 116 may be, for example, a work station or any other test unit and may include, for example, a processor such as a CPU 120, memory 122 such as RAM, ROM or any other suitable memory known in the art and a user interface 124 such as a display and/or keyboard. The CPU, memory, user interface are all in communication via suitable links 126, 128 as known in the art. The CPU also communicates with the unit under test 100 through conventional communication link 130.

Figure 2:
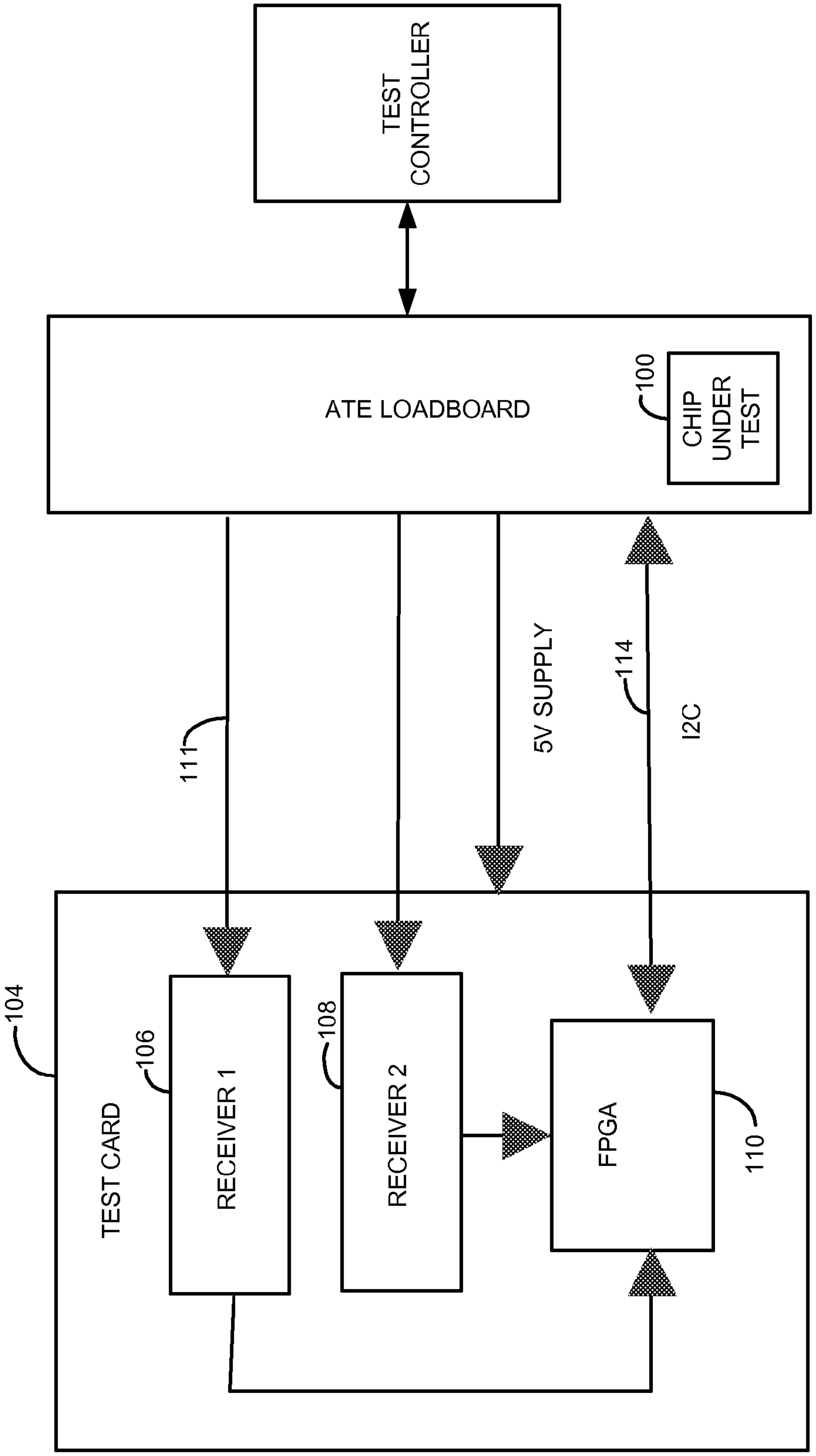
FIG. 2 is a block diagram illustrating one example of an example of the test logic of FIG. 1 being employed in an automated testing environment in accordance with one example.

FIG. 2 illustrates an example of an ATE Test Solution. The test card can be easily ported to ATE environment as shown in FIG. 2. As shown in FIG. 2, with an automated testing environment (ATE) implementation, the ATE loadboard may test one or more chips under test such as integrated circuits that include pixel generation logic. The ATE loadboard is in communication with a test controller that may include or be coupled to a requisite display and may be, for example, a work station or other suitable test system.

The unit under test 100, such as a AMD graphic processor under test has a built-in pseudo random number generator that can be enabled by a simple vector. The FPGA 110 will use the same algorithm to compare with the value of the incoming data. If the result is good, it will send back the PASS/FAIL status via the I2C bus 114. The FPGA 110 has extra IO pin that can be used to toggle a status line if I2C communication is not available (not shown in the figure). If the ATE wants to get more failing data from the FPGA 110, they can follow the I2C protocol that is described below referred to as FPGA Design.

Figure 7:
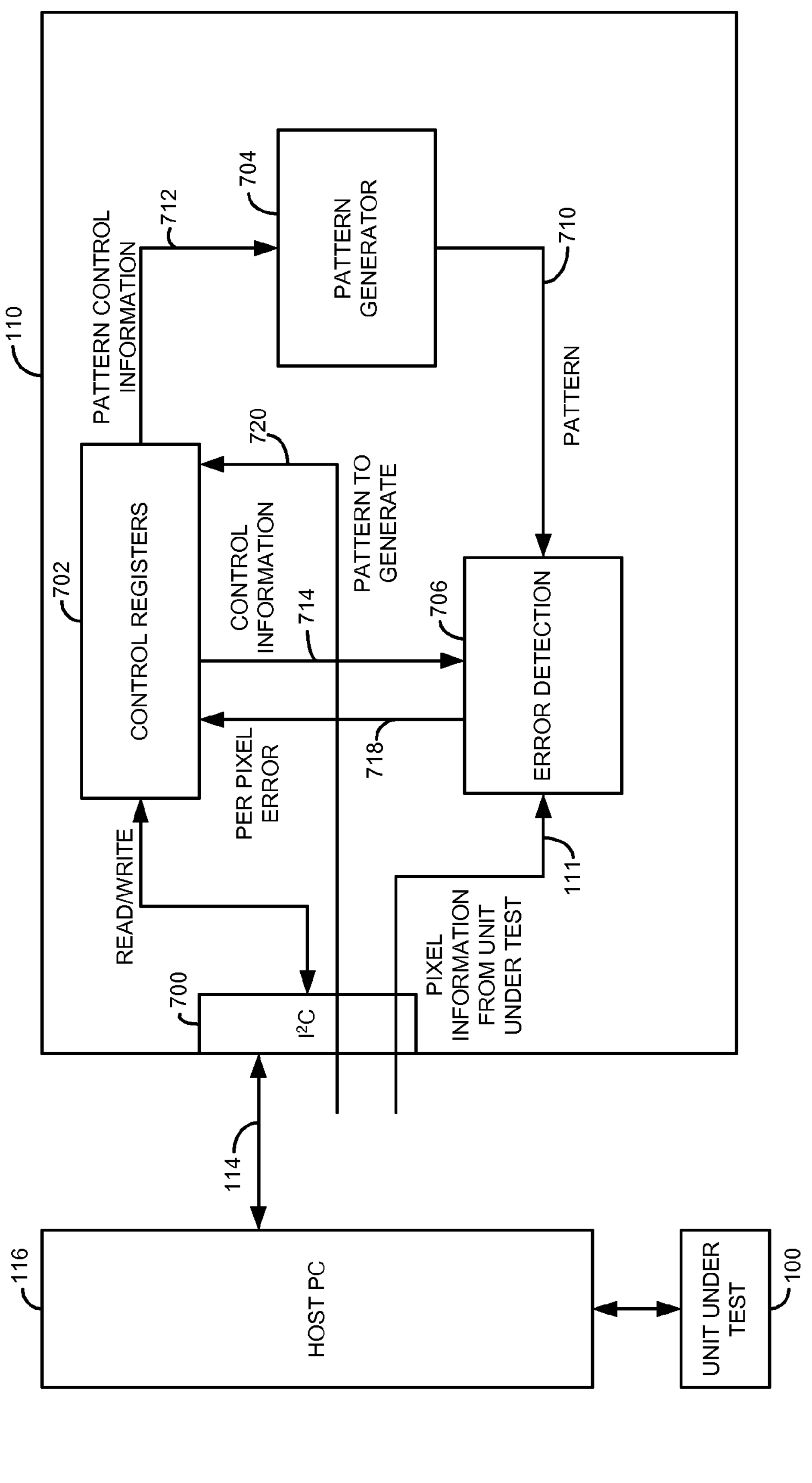
FIG. 7 illustrates one example of an FPGA coupled to a host PC serving as a test controller coupled to a unit under test in accordance with one example.

Test Methodology. The test software executed by the test controller (e.g., test computer) utilizes an algorithm-based method to identify failing pixels. The algorithm of a specific pattern is pre-programmed into both the test software and the FPGA pattern generator (FIG. 7). By implementing this kind of test, no reference frame is required. The algorithm-based test has several benefits over the traditional frame-based CRC: real-time comparison of every bit of every pixel is accounted for and marked as good or bad; the data stream is predictable at the receiving end; simple FPGA (or test) implementation; FPGA space is conserved in that only the number of bit errors on each bit of a pixel is stored; no need to generate reference checksum based on empirical data or several "golden samples"; no need to create multiple checksum tables for different display controllers; the algorithm remains unchanged for different screen resolutions; and allows implementation of pixel-accurate reporting with x-y location on the screen.

A "ramp" pattern may be used as a test pattern by both the test logic and the test computer, where each 30-bit pixel value is represented as an integer generated by a counter. Each color component (RGB) is assigned 8-bits yielding 24-bits of active data. The upper six MSBs are not active in RGB888 mode. With a 1600×1200 resolution screen, the first pixel will be represented as 0x0 while the last will be 0x1D4BFF. A sample of the "ramp" algorithm is shown below:

```
for (y =0; y<y__res; y++)
    for (x=0; x<x__res;x++) {
        d_Draw32BitPixel(x,y,i++,Buffer,Pitch);
    }
```

The function d_Draw32 BitPixel implements the process of populating the on-screen buffer. The pixel-by-pixel comparison is bit accurate as the FPGA 110 is programmed with the same algorithm. Data bits coming into the FPGA 110 from the unit under test are compared directly with the FPGA pattern generator (FIG. 7). By having an internal pattern generator within the FPGA, every incoming bit can be predicted ahead of time and thus allows for a bit-by-bit comparison. The FPGA compares the incoming data stream on-the-fly and does not rely on reference data in the flop area or other storage media. This reduces the space used on the FPGA as well as the time required to perform the test.

Another pattern that can be used is the well-known PRBS7.0 pattern, generated by the polynomial $y=x^7+x^6+1$. The PRBS7.0 generates pseudo-random pixel data that incorporate various inter-symbol interference (ISI) patterns, which are useful for detecting a poor transmitter in the unit under test. The simplicity in implementing the PRBS 7.0 pattern makes it a good choice for stressing the transmitter and testing its robustness.

Figure 3:
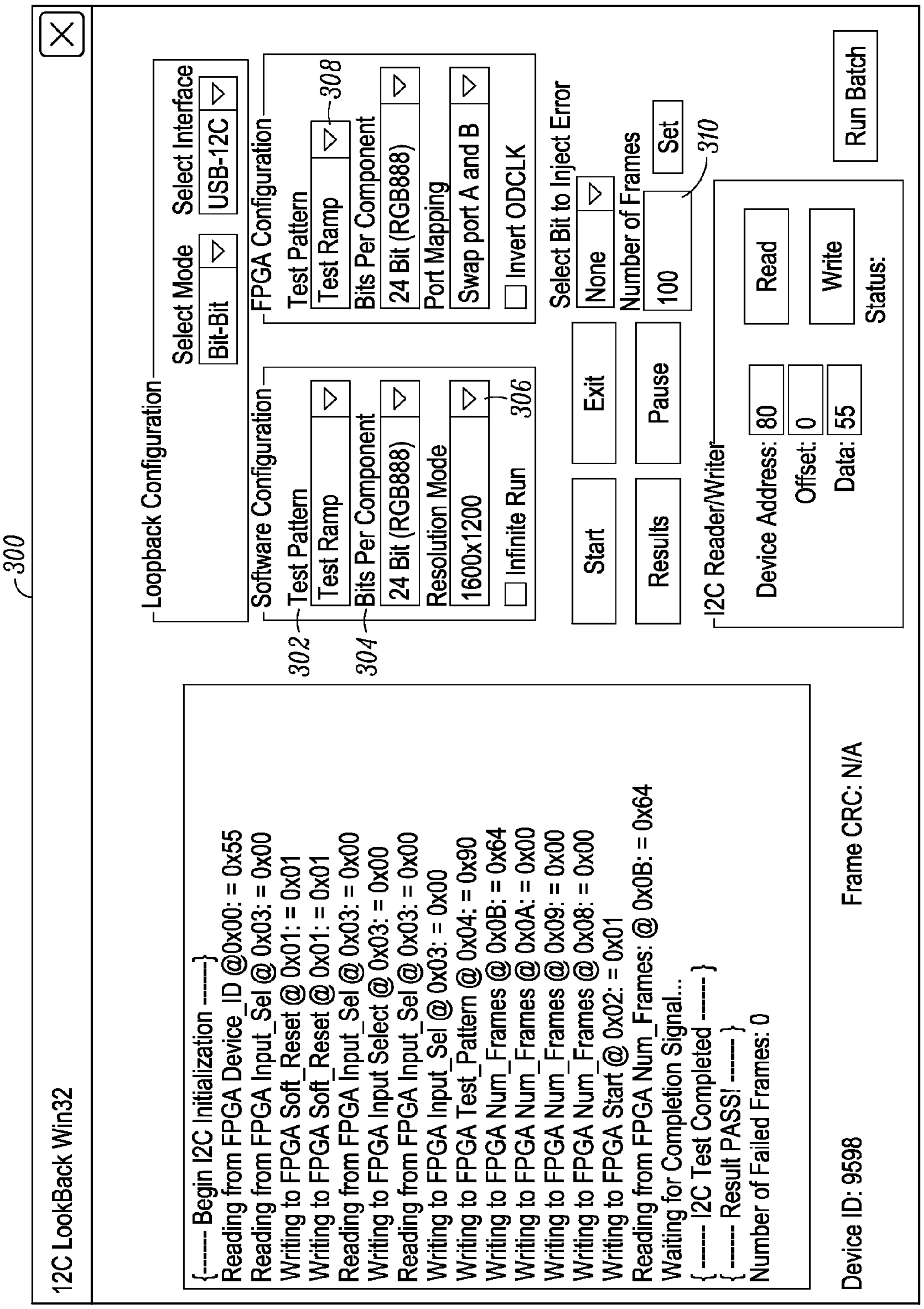
FIGS. 3-6 illustrate examples of user interfaces presented on a display screen for a user in accordance with one example.

FIG. 3 is an example of a user interface 300 for configuring the test card 104 during test setup. The test software and the FPGA 110 can be configured independently for each test. Supported resolutions may include: 640×480, 800×600, 1024×768 and 1600×1200. Other resolutions can include 2560×1600.

The user interface 300 may include, for example, the user interface 124 where the test logic 104, for example, may be a card and put into a slot of the test computer 116. The user interface may also be provided on a separate display connected directly to the test logic 104 if desired. The user interface may present data representing selectable test criteria such as data representing a selectable test pattern 302, the number of bits per component 304, the resolution of the frame being analyzed 306, the type of test pattern 308, the number of frames evaluated 310.

Figure 4:
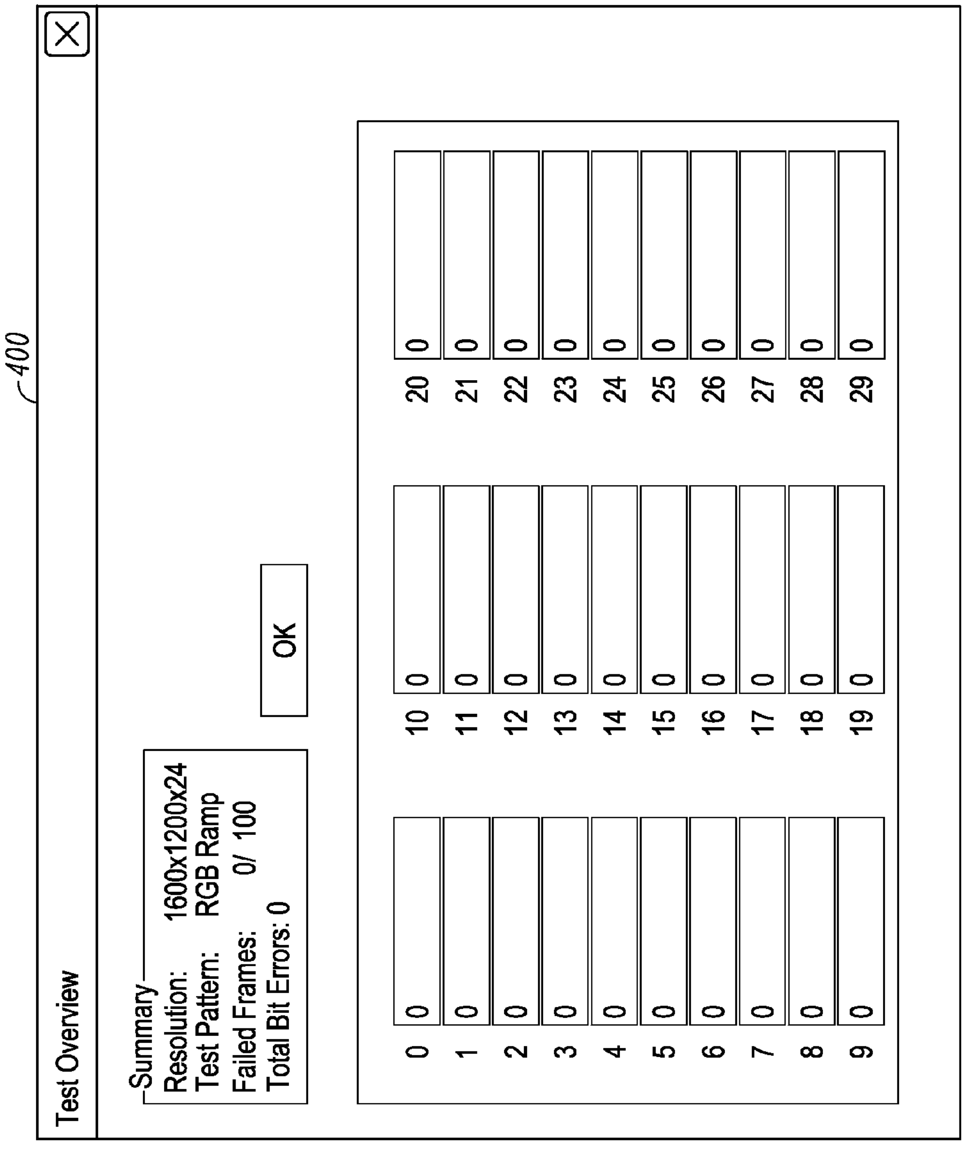

FIG. 4 shows how a test result screen 400 is displayed via the user interface. The number of errors that occur in each bit of a pixel over the entire test is stored and displayed. In this example, a test of 100 frames in 640×480 mode would have a maximum of 30,720,000 possible errors per bit. By specifying the number of frames, a bit-error ratio (BER) metric can be defined based on the number of errors that occurred and the number of bits that were transmitted. The test logic 104 provides the individual pixel error data shown. It will be recognized that a different format may also provided, namely an indication of the number of errors on a per-frame basis as opposed to individual pixel error information.

Figure 5:
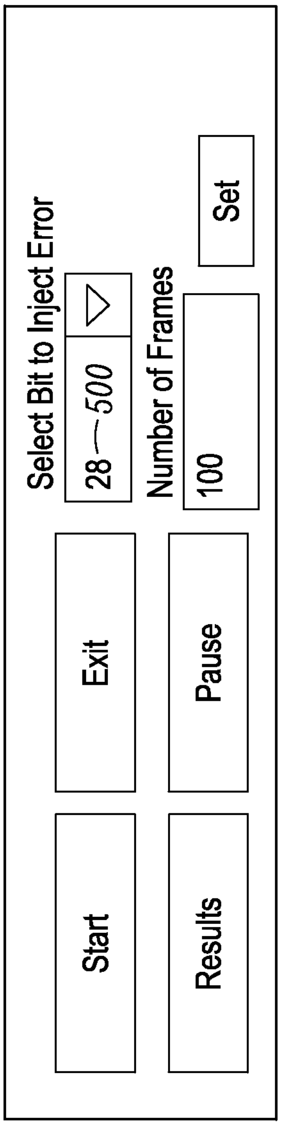
Figure 6:
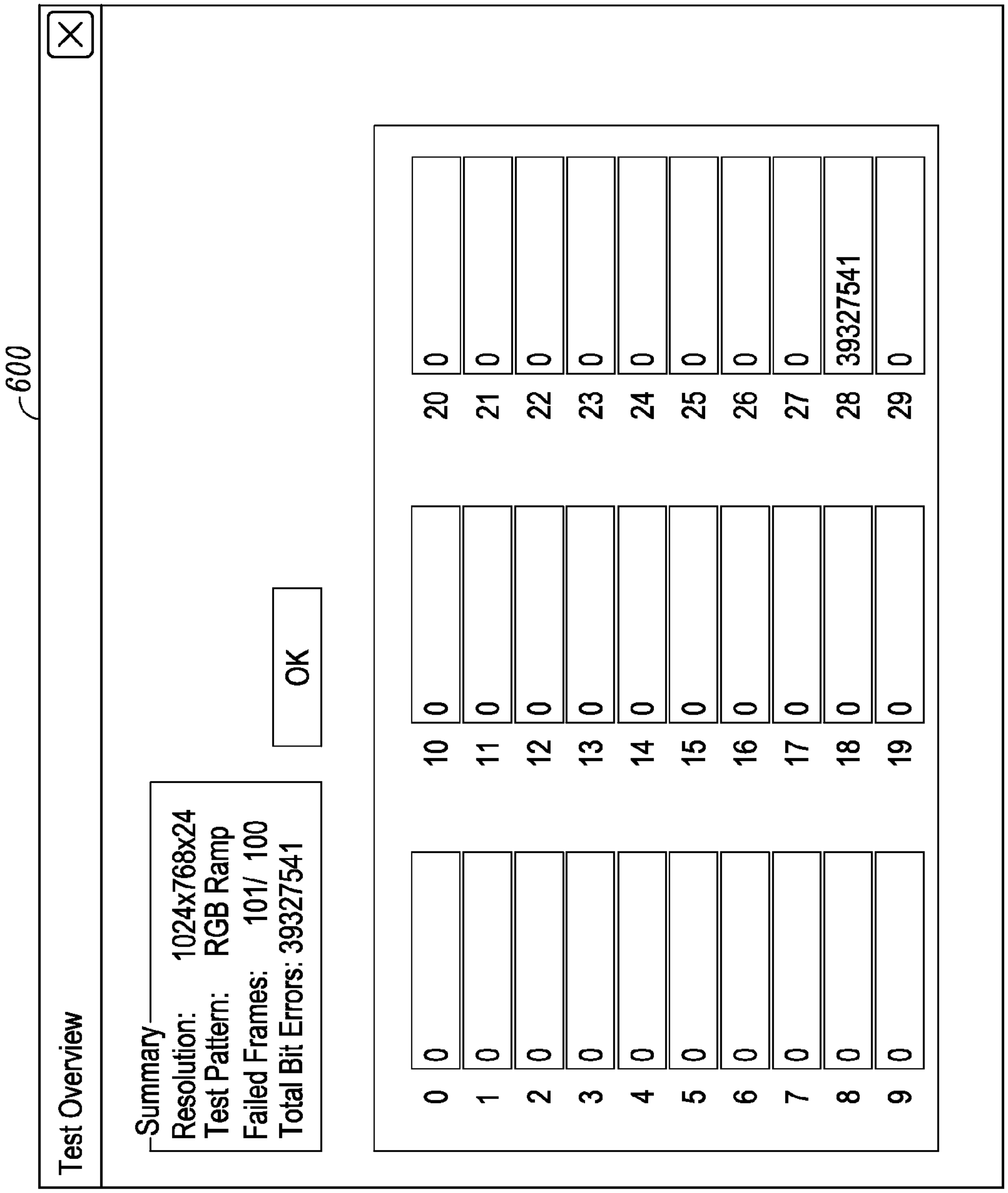

Bit error injection is used to verify the methodology. The test software is designed to have bit-error injection capabilities. A particular bit 500 of all pixels can be chosen via the user interface to produce an incorrect 0 or 1 as shown in FIG. 5. In this example, bit #28 of all pixels has been selected to be incorrect. FIG. 6 shows the user interface screen 600 indicating that the FPGA has successfully detected the error. Note that this error occurs within all pixels. If desired, x-y coordinate specific error injection may also be employed.

FPGA Design—The FPGA meets the following requirements: it must contain enough I/Os for two DisplayPort receivers operating in 30 bpp dual pixel per clock mode; it is capable of running at a speed of 160 MHz; and it has enough internal memory to store run-time results.

One example of an FPGA is a Xilinx XC2VP7 FPGA with 396 user I/Os, 792 Kb of block RAM, and 154 Kb of distributed RAM. Other FPGAs, such as the less costly Xilinx Spartan series, would have also been suitable.

Referring to FIG. 7, the FPGA comprises four major components: I2C Block 700, Control Register Block 702, Pattern Generation Block 704 and Error Detection Block 706. The I2C Block 700 operates as a standard I2C slave and allows the test computer 116 to communicate with the FPGA. The I2C interface 700 gives the user of the test computer 116 direct access to the registers in the Control Register Block 702. The Control Register Block 702 has a predefined set of registers that executing software can use to run a test. Some of the register functions include: which DisplayPort receiver (not shown) to be selected, number of frames to be run, soft reset, test start/end control, pattern generation control, and error detection. The registers set is also expandable for future enhancements of the test suite.

The control registers 702 provide control data such as pattern control information 712 to select which pattern the pattern generator 704 should output. The selected pattern is the same pattern used by the unit 116 that is testing the unit under test 100. The control registers also provide control information 714 to control the error detection block to time the pixel by pixel comparison between the pixel generated by the pattern generator with that received as pixel information 111. The error detection block 706 outputs the per-pixel error data 718 and corresponding screen location data to the control registers 702 so that it can be sent back to the test control unit 116 for display to a user. The test computer 116 also sends the information indicating which pattern to generate 720 to the control registers to identify the pattern control information 712. Accordingly, different patterns may be generated under control of the test computer 116 as described above.

The Pattern Generation Block 704 contains all the predefined algorithms that the software test suite requires. Some of the algorithms include the Ramp test, which is an incrementing data pattern, and the pseudo random test, which is a predictable random data pattern. The output 710 from running these predefined algorithms are input into the Error Detection Block 706.

If the test being run requires pixel-by-pixel comparison, the Error Detection Block 706 compares the real time pixel data to the pixel data 710 generated by the Pattern Generation Block. Results of the test are then stored in the Control Register Block 702 for software to read. If the test being run uses CRCs, the Error Detection Block generates a "capture" frame CRC from the captured pixel data and compares it to the "expected" frame CRC that is stored in the Control Register Block by software. Results of the test are then stored into the Control Register Block for software to read.

DisplayPort supports both low bit-rate at 1.62 Gbps per lane and high bit-rate at 2.7 Gbps per lane. The example of the test card is capable to test up to WQXGA (2560×1600) resolution with all four DisplayPort lanes running at high bit-rate. The maximum operating frequency $F_{max}$ for FPGA is calculated from the following equation:

$$F_{max}=\text{total pixels per frame*refresh rate/number of pixels per clock}=(2560*1600*75\text{ Hz})/2=156.3\text{ MHz}.$$

The current FPGA runs at 200 MHz; however, if the number of predefined pattern generators is increased, the operating frequency of the FPGA could decrease due to increased internal logic delays, and hence 200 MHz may not be met. To work around this problem, one can load selected FPGA codes based on the application of the test station. If the error detection requirements are expanded, a larger FPGA may have to be used in order to increase the internal block RAM storage available. The FPGA used in the current design is I/O limited to three DisplayPort receivers. If a larger number of receivers is required, an FPGA with higher I/O capability will be needed.

Given that higher screen resolutions and interface bandwidth requirements will inevitably increase over time, the FPGA operating frequency will have to also increase in the future. Other data capturing methods may have to be utilized along with the upgrade to higher speed FPGAs. Current implementation can store up to 600~1,000 pixels (depend on the amount of data to be captured). Utilizing very fast and very large SRAMs could store a large amount of "single bit error" on any frame. Software could request capture on selective scanline (as an example) on one frame or consecutive frames. This allows the system to recreate consistent failure and troubleshoot problems quickly.

Bit Error Rate (BER) of DisplayPort—BER is often used in high-speed SERDES to measure quality of IO by knowing how many bits are transmitting without error. VESA Test Specification specifies that the DisplayPort should perform with 10E-9 (or lower) bit error ratio (BER). Any discrepancies between the outgoing data stream (from the transmitter) and the incoming data stream (to the FPGA) can be flagged as errors.

One important criteria of the test solution is the confidence level in the estimation of BER probability. There are a number of papers (e.g., HFTA-05.0: Statistical Confidence Levels for Estimating BER Probability—Maxim Application Notes) showing how the number of error bits and the level of confidence of the system under test are related. In essence, there is a trade-off between the test time and the level of confidence one wishes to accord to the test.

In a test case, ~99% confidence level was achieved with the number of bit errors N<=3 as shown in Table 1. The test time would be 2.47 sec (1.54s+0.93s) if the system tested both 1.67 Gpbs and 2.7 Gpbs rates.

TABLE 1

| Number of bit error N | Number of bits to be transmitted n | Test Time at 1.62 Gbps (sec) | Test Time at 2.70 Gbps (sec) |
|---|---|---|---|
| 0 | 4.61E+09 | 0.71 | 0.43 |
| 1 | 6.64E+09 | 1.02 | 0.61 |
| 2 | 8.40E+09 | 1.30 | 0.78 |
| 3 | 1.00E+10 | 1.54 | 0.93 |
| 4 | 1.16E+10 | 1.79 | 1.07 |

A novel test method and system for high-speed digital transmitters has been described. The proposed approach takes advantage of off-the-shelf receivers and offers an economical test solution for system or ATE testing environment. It also provides diagnostic capability that can lead to improved yield and quality of design. The test solution can be easily changed to support any graphic controller with a DisplayPort connector.

The proposed solution has shown to work well at the transmission rate of 10.8 Gbps using 4 DisplayPort lanes (i.e., each lane running at 2.7 Gbps). 20 boards have been tested and passed in a production line.

Also, integrated circuit design systems (e.g. work stations) are known that create integrated circuits based on executable instructions stored on a computer readable memory such as but not limited to CDROM, RAM, other forms of ROM, hard drives, distributed memory etc. The instructions may be represented by any suitable language such as but not limited to hardware descriptor language or other suitable language. As such, the logic (e.g., circuits) described herein may also be produced as integrated circuits by such systems. For example an integrated circuit may be created for use in a display system using instructions stored on a computer readable medium that when executed cause the integrated circuit design system to create an integrated circuit that is operative to act as the FPGA. Integrated circuits having the logic that performs other of the operations described herein may also be suitably produced.

Disclosed herein is a low cost test solution based on test logic, in one example, a test card and a smart test algorithm capable of handling different screen resolutions. A real time comparison on a per-pixel basis is done by the test logic. The test logic generates its own pattern and results at the same time the unit under test is producing pixels. With this solution one does not need to create an array with checksums for different resolutions, as would be done in a more traditional display test. It also eliminates human interaction which requires an operator watching a screen for hours trying to spot flickering pixel(s) and miss providing a detailed report of failure symptoms.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method of testing pixels output from a pixel generation unit under test comprising:
- generating pixels from the pixel generation unit under test using a first test data pattern to generate pixel information; and
- generating a per pixel error value for a pixel from the unit under test that contains an error based on the pixel by pixel comparison with pixel information substantially concurrently with pixels generated by a different unit using the first test data pattern.

2. The method of claim 1 comprising:
- sending the generated pixel information via a plurality of lanes to the different unit; and
- sending control information via a different channel than the plurality of lanes to the different unit to control selection of which of a plurality of selectable test data patterns to generate.

3. The method of claim 1 comprising providing a user interface that is operative to allow a setting of a per pixel error injection and a number of frames over which to apply the injected error.

4. The method of claim 1 comprising providing a user interface that provides per pixel error values as generated by the different unit.

5. The method of claim 1 wherein the comparison with pixel information generated substantially concurrently with pixels generated by the different unit comprises generating the pixels by the second unit in real time.

6. The method of claim 1 further comprising generating a corresponding pixel screen location for a pixel from the unit under test that contains an error based on the pixel by pixel comparison.

7. A method of testing pixels output from a pixel generation unit under test comprising:
- generating, under control of a first test controller, pixels from the pixel generation unit under test using a first test data pattern to generate pixel information;
- generating a per pixel error value for a pixel from the unit under test that contains an error based on the pixel by pixel comparison with pixel information substantially concurrently with pixels generated by a second test controller using the first test data pattern; and
- displaying the per pixel error value.

8. The method of claim 7 comprising:
- sending, by the first test controller, the generated pixel information via a plurality of lanes to the second test controller; and
- sending, by the first test controller, control information via a different channel than the plurality of lanes to the second test controller to control selection of which of a plurality of selectable test data patterns to generate.

9. The method of claim 8 comprising providing a user interface that is operative to allow a setting of a per pixel error injection and a number of frames over which to apply the injected error.

10. The method of claim 9 comprising providing a user interface that provides per pixel error values as generated by the second test controller.

11. A pixel generation unit test system comprising:

a first test controller operatively coupled to a pixel generation unit under test and operative to generate pixels from the pixel generation unit under test using a first test data pattern to generate pixel information;

a second test controller operatively coupled to the unit under test via one or more communication lanes, and operative to compare, on pixel by pixel basis, the generated pixel information from the pixel generation unit with concurrently generated pixels generated by the second test controller also using the first test data pattern; and operative to generate a per pixel error value and a corresponding pixel screen location for a pixel from the unit under test that contains an error based on the pixel by pixel comparison.

12. The system of claim 11 wherein the second test controller comprises a field programmable gate array and comprises:

control registers that store control information received from the first test controller and that store the per pixel error values;

a test data pattern generator, operatively response to control information from the control registers to output a selected one a plurality of different test data patterns; and error detection logic, operative to compare, on a pixel by pixel basis, the output test data pattern from the test data pattern generator with the pixel information from the unit under test to determine whether there is an error.

13. The system of claim 11 wherein the first test controller is operative to send the generated pixel information via a plurality of lanes to the second test controller; and operative to send control information via a different channel than the plurality of lanes to the second test controller to control selection of which of a plurality of selectable test data patterns to generate.

14. The system of claim 11 wherein the first test controller is operative to provide a user interface that is operative to allow a setting of a per pixel error injection and a number of frames over which to apply the injected error.

15. The system of claim 11 wherein the first test controller is operative to provide a user interface that provides per pixel error values as generated by the second test controller.

16. A test controller comprising:

a field programmable gate array that comprises:

control registers that store control information received from the first test controller and that store the per pixel error values;

a test data pattern generator, operatively response to control information from the control registers to output a selected one a plurality of different test data patterns; and error detection logic, operative to compare, on a pixel by pixel basis, the output test data pattern from the test data pattern generator with the pixel information from the unit under test to determine whether there is an error.

* * * * *